Patented Sept. 16, 1947

2,427,640

UNITED STATES PATENT OFFICE 2,427,640

POLYMERIZABLE ESTERS AND POLYMERS THEREOF

Lynwood N. Whitehill, Berkeley, and Edward C. Shokal, Oakland, Calif., assignors to Shell Development Company, San Francisco, Calif., a corporation of Delaware No Drawing. Application February 1, 1944, Serial No. 520,696

18 Claims. (Cl. 260—79)

This invention relates to new polymerizable compounds and to their polymers. More particularly it relates to esters of unsaturated alcohols with sulfonyl-containing carboxylic acids.

Valuable resins can be produced by the catalytic polymerization of certain unsaturated esters of ethereal oxygen-containing carboxylic acids, such as diallyl diglycolate. It has not been found possible to similarly polymerize the unsaturated esters of the corresponding thio acids, e. g., diallyl thio diglycolate.

We have now discovered the esters of sulfonyl-containing carboxylic acids with alcohols having an unsaturated linkage of aliphatic character between two carbon atoms, one of which is directly attached to a carbon atom to which is directly attached an alcoholic hydroxyl group. We have found that these new compounds can be polymerized to resins of great value.

Accordingly, it is an object of the present invention to provide a new class of unsaturated esters. Another object is to provide polymerizable sulfur-containing compounds. Another object is to provide compounds capable of being polymerized to resinous substances. Another object is to provide for the production of new resins. Another object is to provide new sulfur-containing resins. Other objects will be apparent from the description of the invention given hereinafter.

The new compound are esters of sulfonyl-containing carboxylic acids with real or hypothetical alcohols having an unsaturated linkage of aliphatic character between two carbon atoms, one of which is directly attached to a carbon atom to which is attached an alcoholic hydroxyl group. These alcohols can be described also as compounds of aliphatic character having an unsaturated linkage between two carbon atoms at least one of which is not more than once removed from an alcoholic hydroxyl group.

One subgroup of unsaturated alcohols within the foregoing definition consists of compounds having an unsaturated linkage of aliphatic character between two carbon atoms, one of which is directly attached to an alcoholic hydroxyl group. These compounds are, thus, alpha-unsaturated alcohols. The most desirable alpha-unsaturated alcohols are vinyl-type alcohols, which are compounds having a double bond of aliphatic character between two carbon atoms, one of which is directly attached to an alcoholic hydroxyl group. Vinyl-type alcohols are alcohols of aliphatic character having an alpha-beta double bond. Vinyl-type alcohols have a structure which may be represented by the general formula $$\overset{|}{C}=\overset{|}{C}-OH$$

Of the vinyl-type alcohols a preferred subgroup consists of compounds having a terminal methylene group attached by an olefinic double bond to a carbinol carbon atom, as represented by the general formula $$CH_2=\overset{|}{C}-OH$$

Examples of preferred vinyl-type alcohols are vinyl alcohol, isopropenol, buten-1-ol-2, etc. Examples of other vinyl-type alcohols are propen-1-ol-1, buten-1-ol-1, cyclohexen-1-ol-1, and cyclopenten-1-ol-1, etc. Vinyl alcohol is the preferred specific alpha-unsaturated alcohol.

Another important subgroup of unsaturated alcohols consists of compounds having an unsaturated linkage of aliphatic character between two carbon atoms, one of which is directly attached to a saturated carbon atom which in turn is directly attached to an alcoholic hydroxyl group. These are the beta-unsaturated alcohols. The unsaturated carbon-to-carbon linkage may be a triple bond, as in propargyl alcohol, 2-methyl-butyn-3-ol-2, 2-methyl-hexyn-3-ol-2, octyn-2-ol-1, nonyn-2-ol-1, decyn-3-ol-2 and 2-methyl-nonyn-3-ol-2. More commonly, the unsaturated carbon-to-carbon linkage is a double bond. Compounds having a double bond of aliphatic character between two carbon atoms, one of which is directly attached to a saturated carbinol carbon atom, are allyl-type alcohols. They have in the molecule a structure which can be represented by the general formula $$\overset{|}{C}=\overset{|}{C}-\overset{|}{C}-OH$$

Preferred allyl-type alcohols have a terminal methylene group attached by a double bond to a carbon atom which is directly attached to a saturated carbinol carbon atom, as represented by the general structural formula $$CH_2=\overset{|}{C}-\overset{|}{C}-OH$$

Further preferred are allyl-type alcohols of the latter formula wherein the carbinol carbon atom is primary or secondary, as represented by the formula $$CH_2=\overset{|}{C}-\overset{|}{C}H-OH$$

Representative examples of preferred allyl-type alcohols are the following beta mono-olefinic monohydroxy alcohols: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1- ol-3, 3-tolyl-proten-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, and the more highly unsaturated alcohols: pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien - 2,7 - ol - 1, cyclopenten-2-ol-1, cyclohexen-2-ol-1, etc.

The unsaturated alcohols whose radicals constitute part of the esters of the present invention preferably have no more than about 18 carbon atoms in the molecule and have at least one unsaturated carbon-to-carbon linkage for each 6 carbon atoms. The alcohols themselves need not be capable of separate existence. It is essential only that the compounds of the invention containing the alcohol radicals be stable.

The acids whose radicals form part of the compounds of the invention contain in the molecule one or more carboxyl groups and one or more sulfonyl groups. They have a structure which can be represented by the general structural formula $$R(SO_2-R_1-COOH)_n$$

wherein $R_1$ is divalent hydrocarbon radical, $n$ is a small whole positive number, preferably 1, 2 or 3, and $R$ is an organic radical having a value of $n$. The hydrocarbon radical may be aliphatic, cycloaliphatic or aromatic in character, saturated or unsaturated, and one or more hydrogen atoms thereof may be substituted by halogen, hydroxyl, alkoxy or like groups. The compounds are preferably free from radicals which inhibit or retard polymerization. Divalent sulfur inhibits polymerization.

An important subclass of compounds with which the invention is concerned consists of unsaturated esters of acids of the general formula $$R_2-SO_2-R_3-COOH$$

wherein $R_2$ is a monovalent hydrocarbon radical and $R_3$ is a divalent hydrocarbon radical, either or both of which may or may not be substituted by halogen, hydroxyl, alkoxy or like groups. Examples of such esters are compounds best represented by the following formulas:

CH₃—SO₂—CH₂—COO—CH=CH₂
CH₃—SO₂—CH₂—COO—C(CH₃)=CH₂
CH₃—SO₂—CH₂—COO—CH₂—CH=CH₂
CH₃—SO₂—CH₂—COO—CH(CH₃)—CH=CH₂
CH₃—CH₂—SO₂—CH₂—COO—CH=CH₂
CH₃—CH₂—SO₂—CH₂—COO—C(CH₃)=CH₂
CH₃—CH₂—SO₂—CH₂—COO—CH₂—CH=CH₂
CH₃—CH₂—SO₂—CH₂—COO—CH(CH₃)—CH=CH₂
CH₃—CH(CH₃)—SO₂—CH₂—COO—CH₂—C(CH₃)=CH₂
CH₃—CH(CH₃)—SO₂—CH₂—COO—CH₂—C(Cl)=CH₂
CH₂=CH—CH₂—SO₂—CH₂—COO—CH₂—C≡CH
CH₂=CH—CH₂—SO₂—CH₂—COO—CH₂—CH=CH₂
CH₃—SO₂—CH₂—CH₂—COO—CH=CH₂
CH₃—SO₂—CH₂—CH₂—COO—CH₂—CH=CH₂

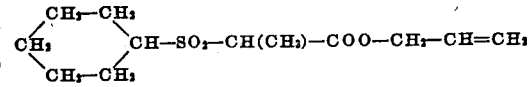

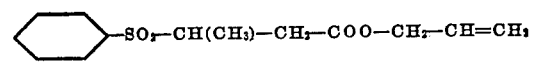

Another important subclass of compounds comprises unsaturated esters of dicarboxylic acids of the general formula $$HOOC-R_4-SO_2-R_5-SO_2-R_6-COOH$$

wherein $R_4$, $R_5$ and $R_6$ are the same or different divalent hydrocarbon radicals which may or may not be substituted by halogen, hydroxy, alkoxy or like groups. Examples of such esters are:

CH₃—OOC—CH₂—SO₂—CH₂—SO₂—CH₂—COO—CH=CH₂
CH₃—CH₂—OOC—CH₂—SO₂—CH₂—SO₂—CH₂—COO—CH₂—CH=CH₂
CH₂=CH—CH₂—OOC—CH₂—SO₂—CH₂—SO₂—CH₂—COO—CH₂—CH=CH₂
CH₂=CH—CH₂—OOC—CH₂—SO₂—CH₂—SO₂—CH₂—COO—CH=CH₂
CH₂—C(Cl)=CH₂—OOC—CH₂—CH₂—SO₂—CH₂—SO₂—CH₂—CH₂—COO—CH₂—CH=CH₂

A subclass of compounds which are preferred by reason of the high quality and extensive application of the resins produced therefrom consists of unsaturated esters of dicarboxylic acids of the general formula $$HOOC-R_7-SO_2-R_8-COOH$$

wherein $R_7$ and $R_8$ are the same or different divalent hydrocarbon radicals which may or may not be substituted by halogen, hydroxy, alkoxy or like groups. Examples of such esters are:

CH₂=CH—CH₂—OOC—CH₂—SO₂—CH₂—COO—CH₂—CH=CH₂
CH₃—OOC—CH₂—SO₂—CH₂—COO—CH₂—CH=CH₂
CH₃—CH₂—OOC—CH₂—SO₂—CH₂—COO—CH₂—CH=CH₂
CH₂=CH—OOC—CH₂—SO₂—CH₂—COO—CH₂—CH=CH₂
CH₂=C(CH₃)—CH₂—OOC—CH₂—SO₂—CH₂—COO—CH₂—CH=CH₂
CH₂=C(CH₃)—CH₂—OOC—CH₂—SO₂—CH₂—COO—CH₂—C(CH₃)=CH₂
CH₂=C(Cl)—CH₂—OOC—CH₂—SO₂—CH₂—COO—CH₂—C(Cl)=CH₂
CH₂=CH—CH₂—OOC—CH₂—CH₂—SO₂—CH₂—CH₂—COO—CH₂—CH=CH₂
CH₂=C(CH₃)—CH₂—OOC—CH₂—CH₂—SO₂—CH₂—CH₂—COO—CH₂—C(CH₃)=CH₂
CH₃—OOC—CH₂—CH₂—SO₂—CH₂—CH₂—COO—CH₂—C(CH₃)=CH₂
CH₂=CH—OOC—CH₂—CH₂—SO₂—CH₂—CH₂—COO—CH₂—CH=CH₂
CH₂=CH—OOC—CH₂—CH₂—SO₂—CH₂—CH₂—COO—CH₂—CH=CH₂

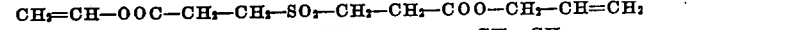

CH₂=CH—CH₂—OOC—CH₂—CH(CH₃)—SO₂—CH(CH₃)—CH₂—COO—CH₂—CH=CH₂

It will be seen that all the foregoing novel esters are esters of sulfonyl carboxylic acids having a sulfonyl group directly attached to two carbon atoms which are not otherwise connected to each other.

Among the radicals which may constitute part of the compounds of the invention as above described are the following monovalent hydrocarbon radicals: methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octadecyl, allyl, methallyl, crotyl, ethyl vinyl carbinyl, butenyl, pentenyl, hexenyl, propargyl, geranyl, oleyl, phenyl, naphthyl, anthyl, tolyl, xylyl, secondary butyl-naphthyl, dipropyl-naphthyl, benzyl, naphthyl-butyl, phenethyl, vinylphenyl, crotonyl-naphthyl, methallyl-phenyl, triallyl-naphthyl, naphthylallyl, 2-phenyl-ethenyl, phenyl vinyl carbinyl, cyclopentyl, ethyl cyclohexyl, tributyl-cyclohexyl, cyclopentenyl, cyclohexenyl and vinyl cyclohexenyl. Divalent and other polyvalent hydrocarbon radicals in accordance with the formulas given herein may correspond to any of the above or other hydrocarbon radicals. Examples of other organic radicals are furyl, pyridyl, pyrrolyl, 1,4-dioxan-yl-6, etc.

The sulfonyl-containing carboxylic acids whose radicals form part of the compounds of the present invention can be produced by known or special methods. One method for their production comprises the oxidation of the corresponding thio compounds. In the case of acids which are devoid of other readily oxidizable elements or groups no special precautions need ordinarily be taken and the oxidation may be effected by any of a large number of oxidizing agents, such as peroxides, e. g. hydrogen peroxide, permanganates, bromine, etc. The oxidation can be effected by treatment with molecular or nascent oxygen, preferably in the presence of a catalyst. Acids containing elements or groups which are sensitive to oxidation, or which very readily form substitution or addition compounds, may usually be satisfactorily produced by the selective oxidation of the corresponding thio acids in accordance with the special techniques known in the art. The thio acids themselves can be produced by any of a number of methods.

Esters of unsaturated alcohols with sulfonyl-containing carboxylic acids can be produced by reacting the acid or ester-forming derivative thereof with the alcohol or ester-forming derivative thereof. They can usually be produced by reacting a metallic salt of the acid with a halide of the unsaturated alcohol, e. g., allyl chloride. Another method is to react a halide of the acid with a metallic alcoholate. Another method is acid-exchange, involving the sulfonyl-containing carboxylic acid and an ester of the unsaturated alcohol with another acid, such as a lower saturated monocarboxylic acid. In other cases the preferred process of production is ester-exchange, as in the reaction of the unsaturated alcohol with an ester of the sulfonyl-containing carboxylic acid and another alcohol, such as a lower saturated aliphatic alcohol. A modification is ester-interchange, wherein an ester of a sulfonyl-containing carboxylic acid with another alcohol, for instance, a lower saturated aliphatic alcohol, is reacted with an ester of another acid, for instance, a lower saturated aliphatic acid, with the unsaturated alcohol.

Special methods can be applied to the production of particular compounds. For instance, the vinyl esters may be produced by reacting the acid with acetylene in the presence of a mercuric salt.

The mixed esters can be produced by esterifying the sulfonyl-containing acids by known or special methods. One method consists in first producing an acid ester of one alcohol, then esterifying with another alcohol. In some cases vinyl mixed esters can be produced by reacting the acid ester of an alcohol other than vinyl with acetylene in the presence of a mercuric catalyst. Another method which is generally more satisfactory comprises reacting the other acid ester with a vinyl ester of a lower aliphatic acid, e. g., vinyl acetate, in the presence of a mercuric salt.

In general, the catalysts and conditions which have been found to apply to the production of previously known esters by the above methods apply also to the production of the compounds of the invention.

In some cases the simple and mixed esters can be produced from other unsaturated esters, particularly unsaturated esters of the corresponding thio acids, which may be selectively oxidized to the sulfonyl-containing esters. Other methods of production can be used.

The monomeric esters of unsaturated alcohols with sulfonyl-containing carboxylic acids are valuable compounds. They can be used as plasticizers, tackifiers, and as intermediates in the synthesis of a large number of compounds. One of their most important uses is the production of the corresponding polymers.

The polymers are usually produced by the polymerization of the monomers although in some cases the polymers of derivatives of the monomers can be first produced, followed by conversion to the desired polymers.

The monomeric compounds can be polymerized singly or in admixture with one another or with other polymerizable compounds, particularly compounds containing one or more unsaturated carbon-to-carbon linkages.

Typical co-polymerizable compounds are those containing in the molecule a single polymerizable olefinic linkage such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of co-polymerizable compounds consists of those having in the molecule two or more, preferably two, conjugated unsaturated polymerizable carbon-to-carbon linkages such as conjugated butadiene, conjugated chloro butadiene, isoprene, the other conjugated pentadienes, the conjugated hexadienes, their homologues, analogues and suitable substitution products. Particularly valuable co-polymers are those of the compounds of the invention with one or more allyl-type di-esters of dicarboxylic acids containing in the molecule an ether linkage positioned between the carboxy groups. An example of such ether-containing dicarboxylic acid esters is diallyl diglycolate.

Where co-polymerization is involved, the compounds to be co-polymerized are usually admixed prior to any substantial polymerization. The most satisfactory resins are ordinarily obtained from mixtures of monomers which are soluble in one another and which undergo interpolymerization, resulting in molecules, each containing a residue of each of the initial monomers. Novel and valuable effects, however, are sometimes obtained by the co-polymerization of compounds incompletely miscible with one another in monomeric and/or polymeric form, which fail to interpolymerize, or which interpolymerize only imperfectly. Another procedure consists in the separate partial polymerization of two or more compounds, followed by the mixing together of the partial polymers and the completion of polymerization. In another procedure one or more monomers are mixed with a partial polymer, partial co-polymer or mixture of partial polymers, followed by the completion of polymerization.

The compounds of the invention can be polymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the co-pending application of Vaughan and Rust, Serial Number 481,052, filed March 29, 1943, which is a continuation-in-part of their co-pending application Serial Number 474,224, filed January 30, 1943. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light is sufficient. Temperatures between about 60° C. and about 150° C. are preferred, although higher and lower temperatures can be used. The monomeric compounds can be polymerized in the massive state or as dispersions or solutions. Where the dispersion method is employed, it may be desirable to select a dispersing medium insoluble in the catalyst involved. With certain compounds polymerization can be effected in vapor state. Continuous or discontinuous processes may be used. Atmospheric, reduced, or superatmospheric pressures may be used. Polymerization may be carried out under a blanket of an inert gas.

The polymerization reaction can be carried to completion without substantial interruption or it can be stopped at any point short of completion. In the case of resin-forming compounds, incomplete polymerization can be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g., fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization. Such compounds can be rendered infusible and insoluble in common non-reactive solvents.

Polymers and co-polymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially polymerized material. Where the modifiers are not added to the monomer, they can be incorporated with preformed polymer by grinding, mixing or milling on heated rolls, or by co-precipitation from a common solvent.

Polymers and co-polymers produced in accordance with the invention in general are characterized by excellent color and resistance to the action of physical and chemical agents. Resins can be produced which are clear, water-white, hard and infusible. Many of the polymers possess film-forming properties and adhere well to metal and to many other kinds of surfaces. They can be used as the basis for valuable coating compositions. Most of the solid resinous products of the invention can be used as glass substitutes. Massive castings can be subjected to machine operations. Many of the resins can be used in extrusion, injection molding and compression molding processes.

Some of the many ways in which the invention can be practiced are illustrated by the following examples in which parts are on a weight basis.

*Example I*

Thiodiglycolic acid was produced by the reaction of sodium sulfide with sodium chloroacetate, followed by the hydrolysis of the salt.

Thiodiglycolic acid, 450 grams, was admixed with glacial acetic acid, 1500 ml. To the mixture was added 30% aqueous hydrogen peroxide, 768 ml., in portions of 30 to 50 ml., over a period of 22 hours. The temperature of the mixture was maintained at 25° C. to 30° C. during the addition.

The mixture was allowed to stand at room temperature for 3 days and was then warmed slowly to 60° C. and maintained at that temperature for 5 hours. The mixture was then evaporated nearly to dryness. Water, 100 ml., was added, the mixture was heated to 100° C. and concentrated hydrochloric acid was added to precipitate the sulfonyl diglycolic acid. The acid was separated from the mixture by successive filtrations at 10° C. and −10° C. The acid was washed with benzene and dried at 95° C. under reduced pressure for 15 hours. The acid was a white, crystalline solid melting at 182° C.

Sulfonyl diglycolic acid, 325 grams, was refixed with allyl alcohol, 290 grams, benzene, 200 ml., and para-toluene-sulfonic acid, 2 grams. After refluxing 8 hours, a benzene-water azeotrope was distilled off, the residue was cooled, chloroform, 250 ml., was added and the solution was washed with 2 N. sodium carbonate and finally with water. It was dried over sodium sulfate and the benzene and allyl alcohol were removed by distillation. The product, diallyl sulfonyl diglycolate, boiled at 138° C. under a pressure of 0.8 mm. of mercury. The refractive index ($n_D^{20}$) was 1.4809. The specific gravity was 1.2485. Diallyl sulfonyl diglycolate is called also diallyl dimethyl sulfone alpha, alpha'-dicarboxylate and has the formula

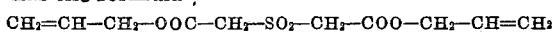

CH$_2$=CH—CH$_2$—OOC—CH$_2$—SO$_2$—CH$_2$—COO—CH$_2$—CH=CH$_2$

Example II

Diallyl sulfonyl diglycolate, 100 parts, was heated in a closed glass mold with benzoyl peroxide, 2 parts, for 96 hours at 65° C. The resulting polymer had a Barcol hardness of above 45. The polymer was a clear, transparent, almost colorless solid.

Example III

A stream of hydrogen sulfide gas was passed intermittently into a mixture of acrylonitrile, 1560 grams, potassium hydroxide, 10 grams, and water, 30 grams. The temperature of the mixture was maintained at 15° C. to 25° C. by external cooling. After 4 hours, the addition of hydrogen sulfide was discontinued. The mixture was allowed to stand undisturbed overnight, after which sodium hydroxide, 0.2 gram, and water, 5 grams, were added and the addition of hydrogen sulfide was continued for 8 hours more.

The crude product, thiodihydracrylonitrile, was added dropwise to a solution of sodium hydroxide, 1.2 kilograms, in water, 3 kilograms, maintained at 65° C. Hydrolysis required 56 hours. The solution was filtered and the thiodihydracrylic acid was precipitated from the filtrate by the addition of hydrochloric acid and by cooling. The product was dried under reduced pressure at 90° C. for 15 hours.

Thiodihydracrylic acid, 460 grams, was mixed with glacial acetic acid, 1300 ml. To the mixture, maintained at about 25° C., was added in 100 ml. portions 30% aqueous hydrogen peroxide, 643 grams. The sulfone acid was precipitated by cooling, separated by filtering and dried under vacuum at 75° C.

Sulfonyl dihydracrylic acid was esterified with allyl alcohol by the procedure described in Example I. Diallyl sulfonyl dihydracrylate distilled at 186° C. under a pressure of 1 mm. of mercury. The ester was a water-white solid melting in the proximity of 50° C. Diallyl sulfonyl dihydracrylate is called also diallyl diethyl sulfone beta, beta'-dicarboxylate and has the formula

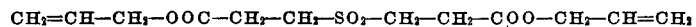

CH$_2$=CH—CH$_2$—OOC—CH$_2$—CH$_2$—SO$_2$—CH$_2$—CH$_2$—COO—CH$_2$—CH=CH$_2$

A mixture of the ester, 100 parts, with benzoyl peroxide, 2 parts, was heated at 65° C. for 96 hours in a sealed glass vessel. The resulting polymer had a Barcol hardness of above 45. The polymer was clear and transparent.

Example IV

A stream of hydrogen sulfide gas is passed into a mixture of crotonitrile, 1970 grams, potassium hydroxide, 10 grams, and water, 30 grams. The mixture is maintained at 15° C. to 25° C. for 9 hours, after which the addition of hydrogen sulfide is stopped and the mixture is added dropwise to a solution of sodium hydroxide, 1.2 kilograms, in water, 3 kilograms, maintained at 65° C. The product, di-isopropyl sulfide beta, beta'-dicarboxylic acid, is precipitated by the addition of hydrochloric acid, separated by filtration, washed and dried under reduced pressure at 90° C.

520 grams of the acid are mixed with 1300 ml. of glacial acetic acid. To the mixture, maintained at about 25° C., is added in 100 ml. portions 30% aqueous hydrogen peroxide, 643 grams. The product, di-isopropyl sulfone beta, beta'-dicarboxylic acid, is precipitated by cooling, separated by filtering and dried under vacuum at 75° C.

The sulfone acid is esterified with allyl alcohol by the procedure described in Example I. The product, diallyl di-isopropyl sulfone beta, beta'-dicarboxylate, has the formula

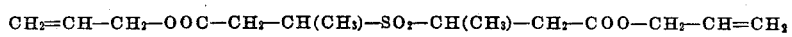

CH$_2$=CH—CH$_2$—OOC—CH$_2$—CH(CH$_3$)—SO$_2$—CH(CH$_3$)—CH$_2$—COO—CH$_2$—CH=CH$_2$

Example V

Diallyl di-isopropyl sulfone beta, beta'-dicarboxylate, 100 parts, is mixed with benzoyl peroxide, 2 parts. The mixture is poured into a glass mold and heated at 65° C. for 96 hours. The resulting polymeric diallyl di-isopropyl sulfone beta, beta'-dicarboxylate is a hard, clear resin, nearly colorless.

Example VI

A mixture of diallyl di-isopropyl sulfone beta, beta'-dicarboxylate, 10 parts, diallyl sulfonyl dihydracrylate, 90 parts, and benzoyl peroxide, 5 parts, is polymerized by being heated in a sealed glass mold at 65° C. The co-polymer is a hard, clear, substantially colorless resin.

Example VII

Diallyl sulfonyl dihydracrylate, 50 parts, is co-polymerized with diallyl sulfonyl diglycolate, 50 parts, under the catalytic influence of benzoyl peroxide, 5 parts, by being heated at 75° C. in a mold. The resinous co-polymer is hard and clear.

Example VIII

A mixture of diallyl sulfonyl diglycolate, 10 parts, diallyl diglycolate, 90 parts, and benzoyl peroxide, 4 parts, is poured into a glass mold and held at 65° C. for 72 hours, followed by 90° C. for 72 hours. A hard, clear, nearly colorless co-polymer is obtained.

Example IX

Sulfonyl diglycolic acid, 325 grams, produced in accordance with Example I, is refluxed with methallyl alcohol, 360 grams, benzene, 200 ml. and para-toluene sulfonic acid, 2 grams. The product is dimethallyl sulfonyl diglycolate, which is separated and purified in the manner described in Example 1. The formula is:

$CH_2=C(CH_3)-CH_2-OOC-CH_2-SO_2-CH_2-COO-CH_2-C(CH_3)=CH_2$

Example X

A mixture of dimethallyl sulfonyl diglycolate, 100 parts, and benzoyl peroxide, 2 parts, is held at 75° C. for 72 hours, then at 100° C. for 72 hours. A resinous polymer is obtained.

We claim as our invention:

1. A polymerizable diester of sulfonyl diglycolic acid with an aliphatic beta mono-olefinic monohydroxy primary alcohol of not more than 18 carbon atoms per molecule having a terminal methylene group.

2. Diallyl sulfonyl diglycolate.

3. A polymerizable ester of sulfonyl dihydracrylic acid with an alcohol having an unsaturated linkage of aliphatic character between two carbon atoms, one of which is attached to a carbon atom which is directly attached to an alcoholic hydroxyl group said acid being completely esterified.

4. A polymerizable diester of sulfonyl dihydracrylic acid with an aliphatic beta mono-olefinic monohydroxy primary alcohol of not more than 18 carbon atoms per molecule having a terminal methylene group.

5. Diallyl sulfonyl dihydracrylate.

6. An infusible polymer of a polymerizable diester of an acid of the formula

$HOOC-R_7-SO_2-R_8-COOH$ wherein $R_7$ and $R_8$ are each a divalent saturated hydrocarbon radical, with an alcohol of not more than 18 carbon atoms per molecule having an unsaturated linkage of aliphatic character between two carbon atoms, one of which is attached to a carbon atom which is directly attached to an alcoholic hydroxyl group.

7. A polymer of a polymerizable diester of sulfonyl diglycolic acid with an alcohol of not more than 18 carbon atoms per molecule having an unsaturated linkage of aliphatic character between two carbon atoms, one of which is directly attached to a carbon atom which is directly attached to an alcoholic hydroxyl group.

8. A resin comprising a polymerized diester of sulfonyl diglycolic acid with an aliphatic beta mono-olefinic monohydroxy primary alcohol of not more than 18 carbon atoms per molecule having a terminal methylene group.

9. Polymeric diallyl sulfonyl diglycolate.

10. Polymeric diallyl sulfonyl dihydracrylate.

11. A polymerizable ester of a sulfonyl carboxylic acid, having a sulfonyl group directly attached to two carbon atoms which are not otherwise connected to each other and are components of unsubstituted hydrocarbon radicals, with an alcohol of not more than 18 carbon atoms per molecule having a double bond of aliphatic character between two carbon atoms, one of which is attached to a carbon atom to which is attached an alcoholic hydroxyl group, said acid being completely esterified and said ester being free from radicals which inhibit its polymerization.

12. A polymerizable ester of an acid of the formula $HOOC-R_7-SO_2-R_8COOH$, wherein $R_7$ and $R_8$ are each a divalent saturated hydrocarbon radical, with an alcohol of not more than 18 carbon atoms per molecule having an unsaturated linkage of aliphatic character between two carbon atoms, one of which is attached to a carbon atom which is directly attached to an alcoholic hydroxyl group, said acid being completely esterified and said ester being free from radicals which inhibit its polymerization.

13. A polymerizable ester of sulfonyl diglycolic acid with an alcohol of not more than 18 carbon atoms per molecule having an unsaturated linkage of aliphatic character between two carbon atoms, one of which is directly attached to a carbon atom which is directly attached to an alcoholic hydroxyl group, said acid being completely esterified and said ester being free from radicals which inhibit or retard its polymerization.

14. A diallyl ester of a dicarboxylic acid having a sulfonyl group directly linked to two alkylene radicals, each of which is directly joined to a carboxyl group.

15. A polymerizable ester of allyl alcohol with an aliphatic dicarboxylic acid having the carboxyl groups directly linked by alkylene radicals to a sulfonyl group, said acid being completely esterified.

16. A polymerizable ester of a monohydroxy-substituted beta-olefinic hydrocarbon of not more than 18 carbon atoms per molecule with a dicarboxylic acid having a sulfonyl group directly linked to two alkylene radicals, each of which is directly joined to a carboxyl group, said acid being completely esterified.

17. A polymerizable ester of a monohydroxy-substituted beta-olefinic hydrocarbon of not more than 18 carbon atoms per molecule with an aliphatic carboxylic acid having a sulfonyl group directly attached to two carbon atoms which are not otherwise connected to each other, and are components of unsubstituted hydrocarbon radicals, said acid being completely esterified.

18. A polymer of a polymerizable ester of a sulfonyl carboxylic acid having a sulfonyl group directly attached to two carbon atoms which are not otherwise connected to each other and are components of unsubstituted hydrocarbon radicals with an alcohol of not more than 18 carbon atoms per molecule having an unsaturated linkage of aliphatic character between two carbon atoms, one of which is attached to a carbon atom to which is attached an oxygen atom of an alcoholic hydroxyl group, said acid being completely esterified and said ester being free from radicals which inhibit its polymerization.

LYNWOOD N. WHITEHILL.
EDWARD C. SHOKAL.

REFERENCES CITED

The following references are of record in the file of this patent:

UNITED STATES PATENTS

| Number | Name | Date |
| --- | --- | --- |
| 2,345,041 | Ericks et al. | Mar. 28, 1944 |

OTHER REFERENCES

Beilstein, Handbuch der Organische Chemie, vol. 3 (1921), page 257.